July 27, 1965   R. K. STOUT   3,196,984
METHOD OF CONVEYING ARTICLES AND CONSTRUCTION
OF CHECKOUT EQUIPMENT
Filed Aug. 26, 1963   5 Sheets-Sheet 1

INVENTOR.
R. K. STOUT
BY

July 27, 1965   R. K. STOUT   3,196,984
METHOD OF CONVEYING ARTICLES AND CONSTRUCTION
OF CHECKOUT EQUIPMENT
Filed Aug. 26, 1963   5 Sheets-Sheet 2
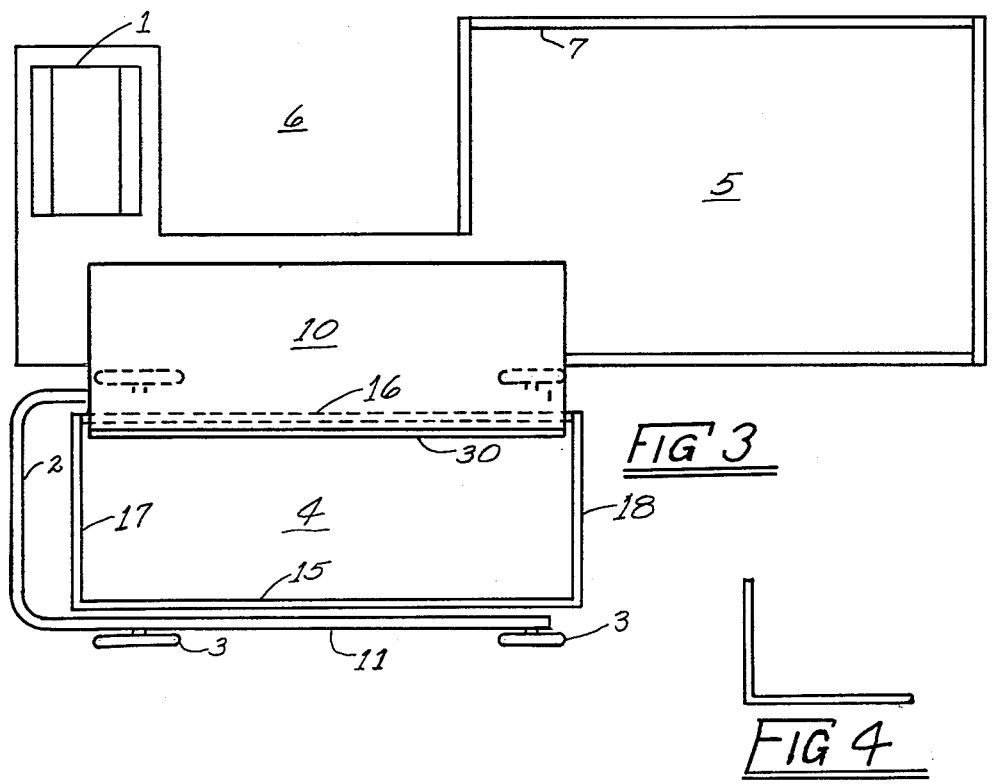
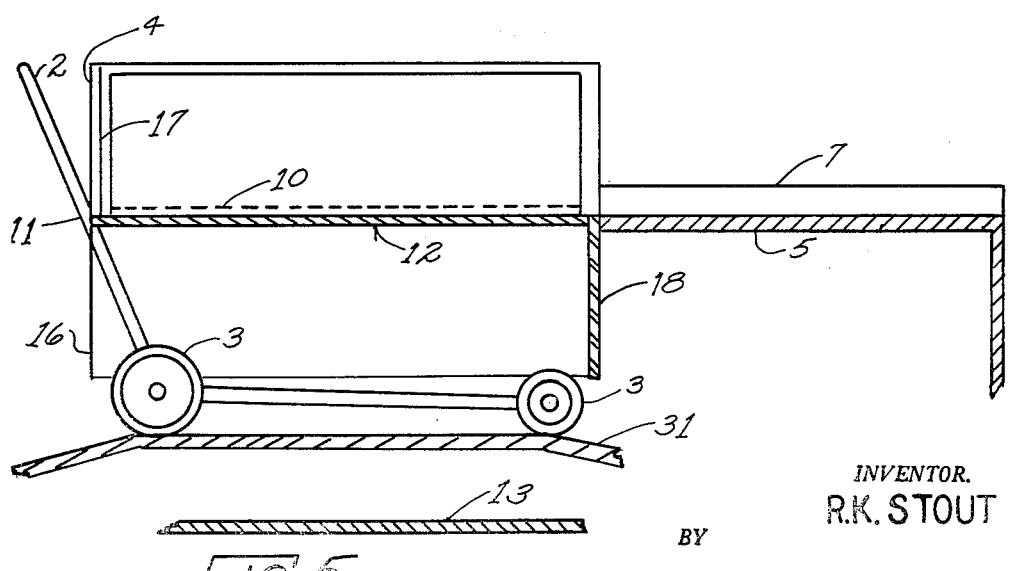
INVENTOR.
R.K. STOUT
BY

INVENTOR.
R.K. STOUT

INVENTOR.
R.K. STOUT

United States Patent Office 3,196,984
Patented July 27, 1965

3,196,984
METHOD OF CONVEYING ARTICLES AND CONSTRUCTION OF CHECKOUT EQUIPMENT
Raymond K. Stout, 101 Coronado Drive, Clearwater Beach, Fla.
Filed Aug. 26, 1963, Ser. No. 304,592
7 Claims. (Cl. 186—1)

This invention relates to an improved checkout and unloading station for shopping markets, grocery stores and other places where articles are gathered in baskets or carts and then conveyed or transported to a checkout area or cashier, where they may be easily and readily unloaded. After the carts are unloaded, they may be ejected from the checkout station to a storage area for future use. Another important feature of the invention is provision in the marketing cart for a platform forming the bottom of the cart, thereby supporting the contents thereof while the customer is transporting them to the cashier, where the cart is positioned over an elevating mechanism, permitting the bottom to be elevated and thereby raise the merchandise contained therein to a level which will facilitate rapid and easy unloading of the cart. The invention further contemplates the use of photo electric cell mechanism to regulate the height to which the cart bottom is raised, thereby preventing the merchandise from spilling over the counter or floor.

Marketing baskets and carts have previously been so designed, that the customer was required to remove the articles from the basket and place them upon the table top or moving belt, where the cashier picked them up and placed them to the rear of the counter. It was not only difficult for the customer but also time consuming to do this.

This previous design also required the customer to push the cart on through the line, load it with filled sacks and then push it to the parking lot for unloading in his car. The customer frequently neglected to return the cart and in some cases actually took them home. The carts were designed for store use and taking them to the parking lot shortens their life by bending wheels, axles, frames and baskets. For this reason and also due to the relative high cost of the carts the store management prefers to keep the carts inside the store and use cheaper and more sturdy carts in the parking lots, which may be designed specifically for the purpose.

The invention will be more fully described in the specification hereinafter following and will be more specifically pointed out in the drawings and claims appended hereto.

In the drawings wherein like symbols refer to like or corresponding parts throughout the several views:

FIG. 3 is a top plan view of a checkout counter and marketing basket, the side and one end of which may be lowered and the bottom moved sideways so that the articles may be readily removed.

FIG. 4 is an end view of the basket bottom.

FIG. 5 is a side elevation view of the checkout counter and basket showing end and one side lowered.

Figure 9:
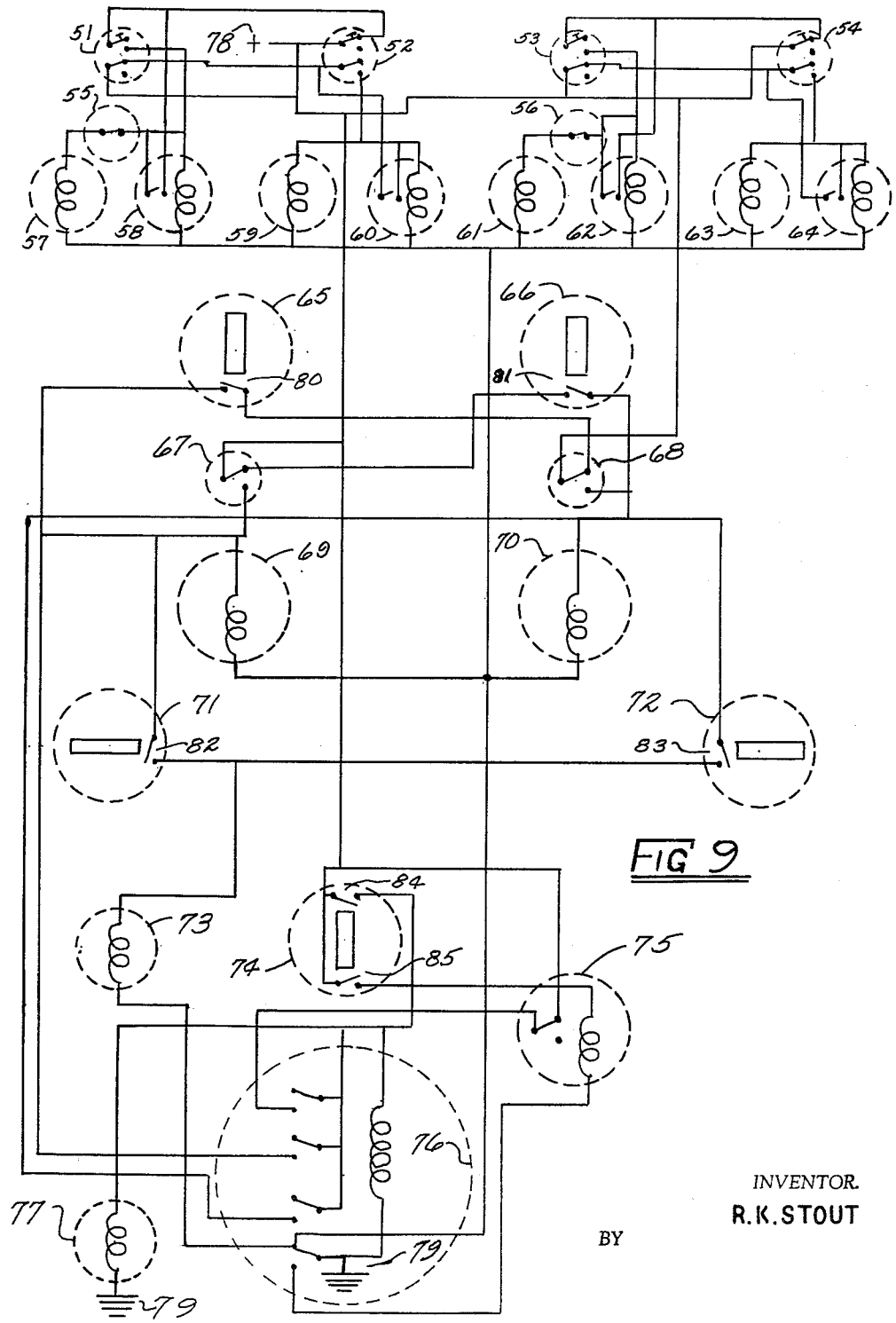

FIG. 9 comprises the wiring diagram of the article lift, and automatic cart control for the pair of cashiers' stations.

Figure 1:
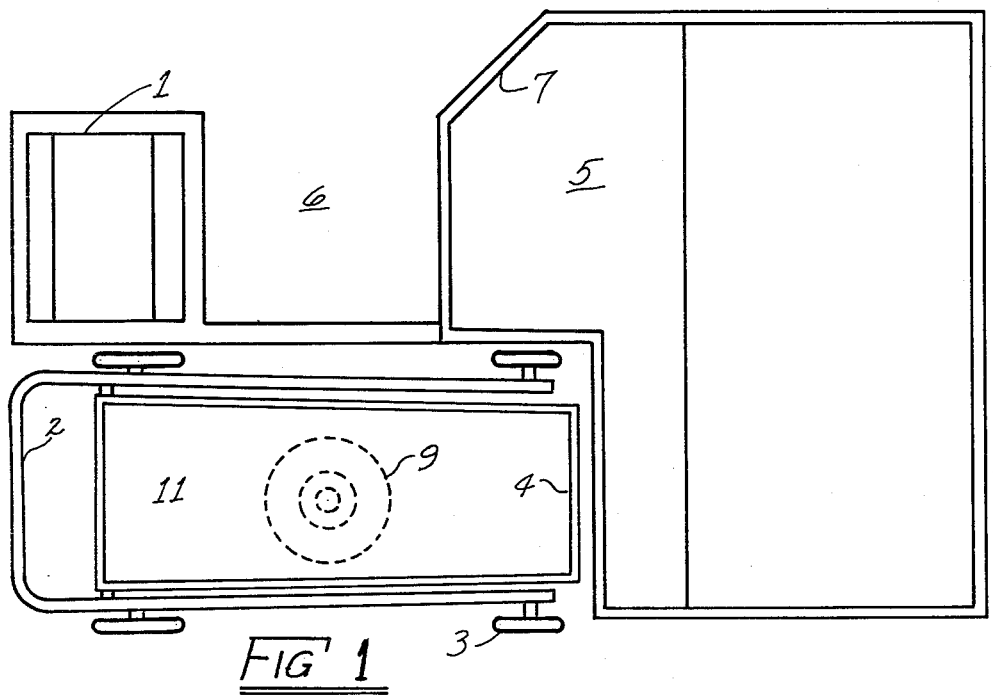
FIG. 1 is a top plan view of a cashier's checkout counter and marketing basket or cart, the bottom of which may be raised for easy removal of the articles located in the basket.

Referring more particularly to the drawings:

FIG. 1.—In the form illustrated I is a cash register or similar counting device which is used by the checkout operator located at station 6. The marketing cart II is shown adjacent the counter 5 and is positioned over the lifting device 9. The cart handle 2 forms a part of the cart frame upon which is mounted the wheels 3 and a container or basket 4. Around the counter is a railing 7 which keeps articles in the desired area.

Figure 2:
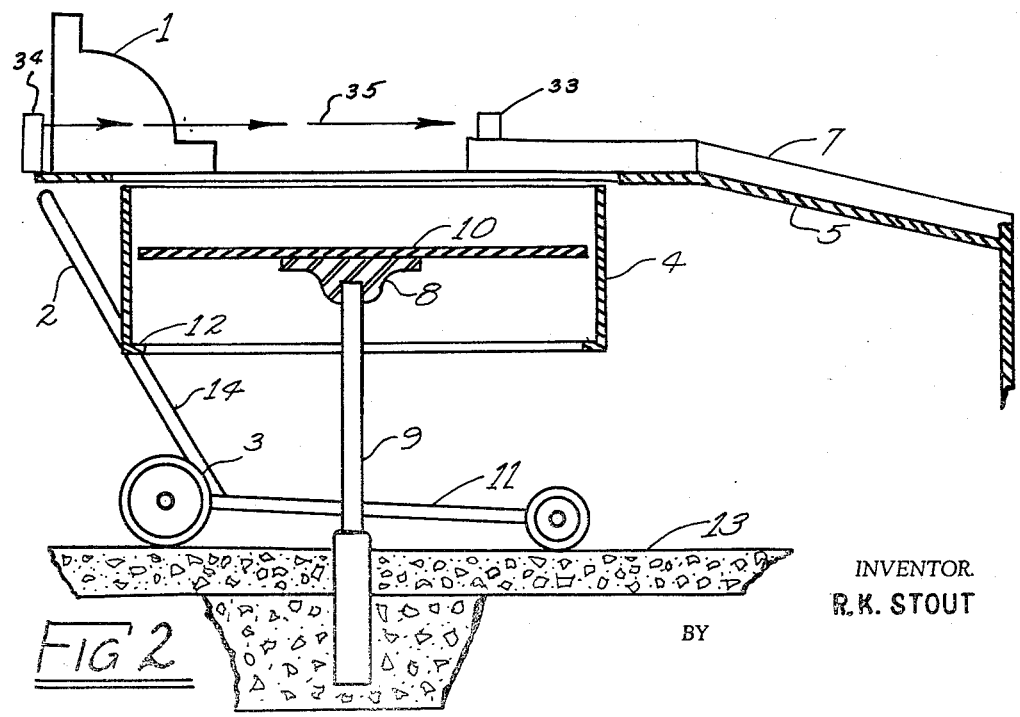
FIG. 2 is a side elevation view of the same checkout counter, with the basket, counter and floor shown in cross-section.

FIG. 2 is a side elevation view of FIG. 1, all items are identical with those listed for FIG. 1 and in addition the load supporting bottom 10 is shown attached to the bottom engaging device 8. The bottom support 12 supports the bottom when it is in the down position, the cart frame is illustrated at 14. A photo-cell circuit is employed for controlling the height of the basket bottom, the light source 34, emits beam 35, thereby activating 33.

FIG. 3.—The basket 4 is shown with a laterally moving basket bottom 30 and a vertically moving end wall 18, a vertically moving side wall 16, stationary side wall 15, stationary end 17 and a laterally moveable bottom 10. All other numbered items being identical and operating in a manner similar to those of FIG. 1. The movable wall and end are designed for manual operation and the basket bottom may be pushed or pulled toward the operator's position for easy removal of the contents. Power means (not shown) controlled by the operator may be employed for operating the moveable side wall, moveable end and laterally moving basket bottom. The basket is shown with the side and end lowered and the basket bottom to one side.

FIG. 4 is an end view of the laterally moving basket bottom.

In FIG. 5, which is a side elevation of FIG. 3, the cart is shown on a raised platform 31 the height of which is so designed that the basket bottom will be even with the counter 5. All other numbered items are identical with those of FIG. 3.

Figure 6:
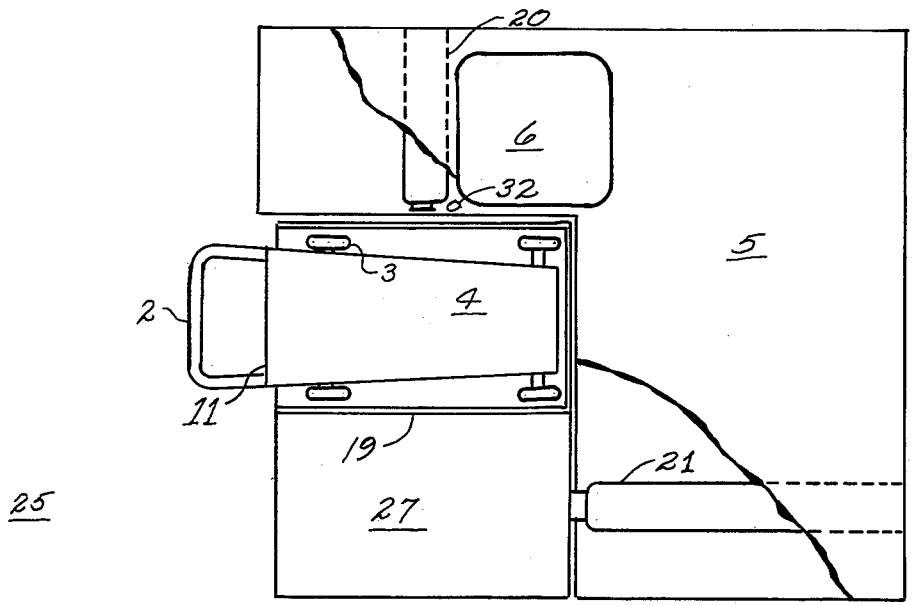
FIG. 6 is a top plan view of a portion of the checkout counter, together with the marketing basket and means for pushing the basket or cart to one side and then to the rear.

FIG. 6 illustrates a cart 11 equipped with a handle 2, wheels 3, and basket 4. The cart is shown on a laterally moveable platform 19 located adjacent the operator's station 6, the counter or table is shown at 5. In the form illustrated the cart was manually pushed into position by the customer and after all articles have been removed, the operator pushes an energizing button 32, thereby actuating the laterally reversing power means 20, said power means pushes the platform to the ejection station 27, transporting the cart with it. When the platform arrives at this position it actuates the cart ejection means 21, which in turn pushes the cart off the platform and into a storage area 25. Further detail operation is shown and described in the wiring diagram FIG. 9.

Figure 7:
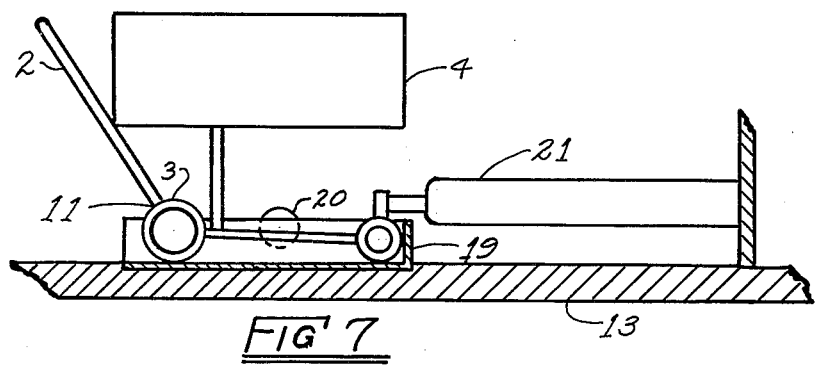
FIG. 7 is a side elevation view of the equipment shown in FIG. 6.

FIG. 7 being a side elevation view of FIG. 6, the following numbers are identical and operate similar to those shown in FIG. 6—2, 3, 4, 11, 19, 20 and 21. In this figure the floor is shown as 13 and it is apparent that the cart is in a position and ready to be ejected from the platform by cart ejecting power means 21.

Figure 8:
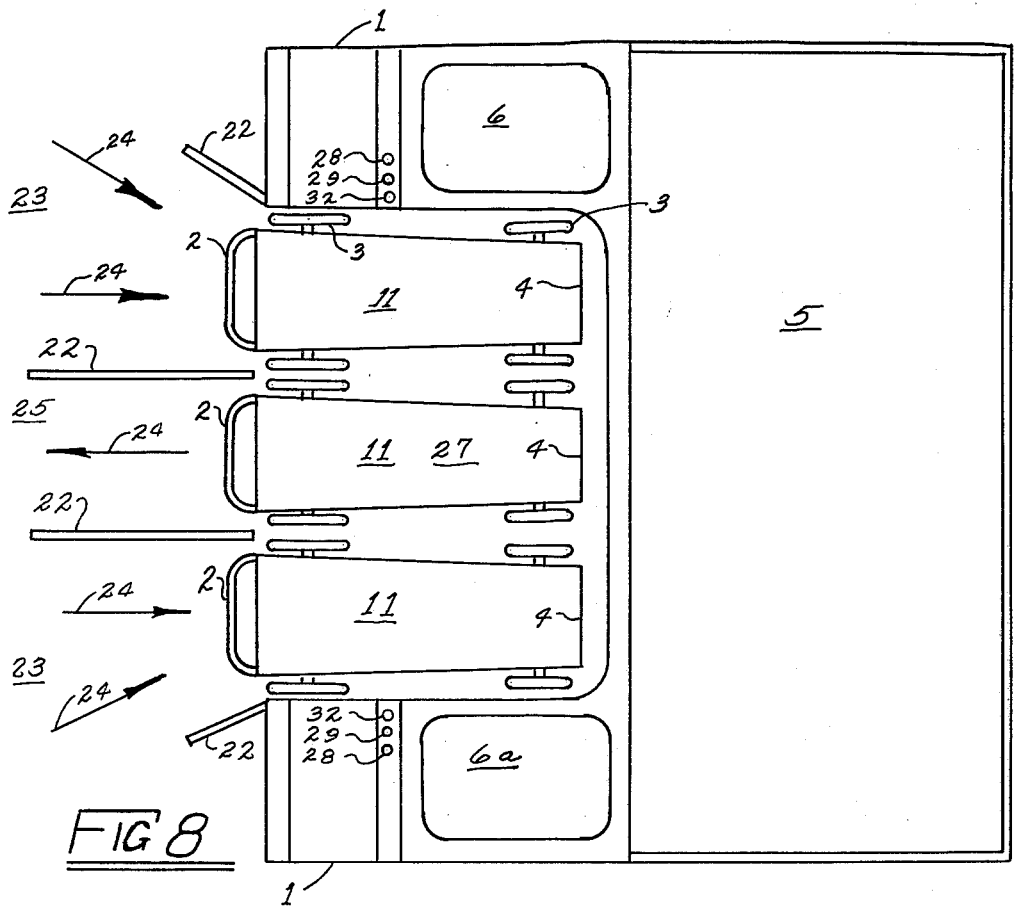
FIG. 8 is a top plan view of a pair of checkout counters whereby the flow of carts is so controlled that they merge and form one line of carts.

FIG. 8.—The portion of the invention illustrated in this figure embodies a dual system whereby two marketing carts 11 are shown in place and both may be unloaded at the same time by operators at stations 6 and 6a. The operator controls the height of the articles in the cart 11 by switch 28 which raises the basket bottom and therefore the articles contained therein. Switch 29 lowers the basket bottom. When one operator is ready to remove her cart she operates her respective switch 32 and the cart is moved laterally to the ejection station 27. When the cart arrives at this station it is pushed off the platform in a direction as illustrated by the arrow 24 into a storage area. The mechanism of the two stations is so designed that the ejected carts from both stations, will merge into a single line 25, and it is so interlocked that only one cart will be ejected at a time as illustrated in the wiring diagram FIG. 9. Guide rails 22 are provided to aid in aligning the carts for easy entry from the shopping area 23 and also for ejecting them to the storage area 25. The arrows 24 illustrate the direction of cart movement. The following items are identical with those shown and described in former figures, cashier's register 1, cart handle 2, wheels 3, and cart basket 4 and counter 5.

FIG. 9.—The wiring diagram represents the electrical operation of equipment shown in FIG. 8. The first operator may manually operate the double pole double throw switch 51, said switch actuates the article raising solenoid valve 57 and the electrical locking relay 58, this article raising solenoid valve causes the power unit 65 to raise the bottom of the basket. The photo-electric operated switch 55 is normally closed, thereby permitting the previously described circuit to function. When the articles in the basket have raised to a point where they interrupt the light beam this switch is opened and the movement of the unit is stopped until the articles interrupting the beam are removed and at this time the power unit will again raise the bottom of the basket. In event the first operator wishes to lower the articles at any time she would manually operate the double pole double throw switch 52, said switch activates the article lowering solenoid valve 59 and the electrical locking relay 60, the article lowering solenoid valve actuates the power means 65 to lower the bottom of the basket. The switches 51 and 52 are electrically interlocked as illustrated, so that the one that is operated last, has control over the other.

A single pole, single throw, normally closed switch (not shown) could be inserted in series with the photoelectric operated switch 55 and which when manually operated to the open position, would stop the movement of the power means 65. Switch 52 also automatically serves as a cart ejection switch. If said switch were operated and the circuit not changed by switch 51 the power means 65 would lower the basket bottom until the limit switch 80 were closed, this switch energizes the solenoid operated valve 69 provided the second operator's circuit is not busy removing the cart from the second station. The solenoid valve in turn operates the power means 71 which pushes the cart platform to one side and into the ejection area. The first movement of the platform operates the mechanically operated switch 67 which electrically locks the solenoid valve 69 open. In doing this the switch 67 removes power from the second operator's ejection means until the first operator's platform has returned and ready to accept another cart. As the power means 71 completes one full stroke it closes the limit switch 82 which in turn operates the solenoid valve 73, this solenoid valve controls the power means 74 so as to eject the cart from the platform and into the storage area. Upon completion of this operation the power means 74 closes switch 84 which in turn operates relay 76. During this operation switch 84 also energizes the solenoid operating valve 77, said valve controlling the three power means 71, 72 and 74 so as to return them to their original position. The relay 76 serves as a holding relay and will remain in the closed position until the three power units are in the starting position, whereby carts may be pushed upon their respective platforms. After all three power units are returned, relay 76 is released and this in turn restores power to all of the circuits by completing the ground return 79. Relay 75 is for releasing its respective portion of the circuit for resetting relay 76 after switch 85 is closed.

The operation of the second operator's station would be similar to that above, except it would control the cart at the 2nd position. Carts from both the 1st and 2nd operators' stations would be ejected into one common line or storage area. The two stations are electrically interlocked as shown, so that only one cart is ejected at a time.

The above would indicate a direct current operation, but it may also be used as an alternating current operation whereby the grounded side of the line 79 would remain the same and the side marked plus 78 would be above ground potential.

The foregoing is considered as illustrative only of the principles of the invention. Further, since numerous modifications and changes will readily occur to others it is not desired to limit the invention to the exact construction arrangement or operation shown and described, and therefore I reserve the right to all such modifications and changes as may come within the scope of the following claims.

I claim:

1. In a merchandise or article handling and checkout system involving the unloading of a portable marketing cart for transport of merchandise, a checkout operator's station including a table or counter, an elevating mechanism adjacent the table, said marketing cart being adapted to be moved into an area adjacent the table and positioned over the elevating mechanism, said marketing cart having a container thereon with side walls and a load supporting bottom adapted to be elevated upward relative to the side walls of the container, reversible power means for actuating the elevating means from a retracted position to engage the load supporting bottom of the container on said marketing cart and to elevate the same thereby raising the articles in the container to a level, for ease of unloading onto said table at the operator's table or station, control means for said power means whereby said power means may be actuated in one sense under control of the operator to elevate the bottom of the marketing cart to facilitate unloading and operable in the reverse sense to retract the elevating means to an initial inactive position thereby permitting the cart to be removed.

2. The structure as claimed in claim 1, including means for limiting the elevation of the bottom of the basket relative to the side walls thereof to prevent spillage of the contents of the basket.

3. The structure as claimed in claim 1, including means for controlling the elevating means whereby the height of the basket bottom is so controlled as to raise the articles contained in the basket to a predetermined height with respect to the counter top.

4. The structure as set forth in claim 1, including a photo electric control means for controlling the elevating power means, said photo electric control means including at least one control beam of light positioned at a predetermined elevation with respect to the bottom of the basket of the cart, when the latter is positioned over the elevating means, said beam of light adapted to be intercepted by articles contained within the basket and projecting above the top thereof, a relay controlled by the beam of light and normally inactive when the light beam is uninterrupted and effective upon interruption of the light beam to de-energize the power means which engages the elevating means.

5. In a merchandise or article handling and checkout system involving the unloading of a cart, a checkout operator's station including a table or counter, a horizontally movable platform adjacent the counter, an elevating mechanism located below the top surface of the platform and being adapted to protrude above the platform, said cart being adapted to be moved upon the said platform and positioned over the elevating mechanism, a horizontal operating mechanism for moving the platform in a horizontal plane and in a direction away from the operator's or checkout position, an additional horizontal operating mechanism operating in a direction so as to remove the cart from the platform, said marketing cart, having side walls and a load supporting bottom adapted to be elevated upward relative to the side walls, power means for actuating the elevating means from a retracted position to engage the load supporting bottom of the cart and to elevate the same to raise articles in the container to a level for ease of unloading, additional power means for actuating the horizontal operating mechanism for removing the cart from the area immediately adjacent the operator's position and still another power means for actuating the mechanism for removing the cart from the platform and means for returning all power units to their former positions at the correct time, the aforesaid power means may be actuated in one sense under the control of the operator.

6. The structure as claimed in claim 5 including means for controlling the various power means to secure the proper time phasing of the various units.

7. An article handling and checkout system as claimed in claim 5 including another article handling and checkout system both operating as one complete unit, one serving as a left and the other as a right element, the actuation mechanism for removing the cart from the platform to serve both right and left elements, thereby causing the carts to merge into a single line for removal to a storage line or area.

References Cited by the Examiner
UNITED STATES PATENTS

| | | | |
|---|---|---|---|
| 1,689,760 | 10/28 | Young | 214—44 |
| 2,633,253 | 3/53 | Martin. | |
| 2,672,218 | 3/54 | Genning | 186—1.1 |
| 2,743,827 | 5/56 | Winokur. | |
| 2,980,212 | 4/61 | Foster. | |
| 3,028,931 | 4/62 | Donovan. | |

SAMUEL F. COLEMAN, *Primary Examiner*.

ANDRES H. NIELSEN, *Examiner*.